Nov. 26, 1968 R. S. TOWNSEND ET AL 3,412,566

THERMOELECTRIC APPARATUS

Filed June 21, 1965

INVENTORS
Russell S. Townsend
Richard O. Crouch

BY Thomas B. Hunter
ATTORNEY 3,412,566
Patented Nov. 26, 1968

3,412,566

THERMOELECTRIC APPARATUS

Russell S. Townsend and Richard O. Crouch, Fort Smith, Ark., assignors to Borg-Warner Corporation, Chicago, Ill., a corporation of Illinois Filed June 21, 1965, Ser. No. 465,660
1 Claim. (Cl. 62—3)

ABSTRACT OF THE DISCLOSURE

A thermoelectric module block assembly including a matrix of P-type and N-type thermoelectric elements joined by bus bars to provide a matrix having a hot side and a cold side. A pair of aluminum heat transfer blocks, each having a thin enamel coating in engagement with opposite sides of the matrix, are secured tightly thereto; and a thermoplastic tape surrounds the matrix at the pehiphery to vapor seal the module assembly.

This invention relates generally to thermoelectric refrigeration apparatus, and more particularly to an improved module block assembly having a ceramic or porcelain coating on the heat transfer blocks to provide a thermally-conductive, electrically-insulating interface.

It is a principal object of the invention to provide an improved thermoelectric module block assembly, suitable for use in refrigerators and other apparatus using the Peltier refrigeration effect, which is simple in construction and can be assembled without soldering or the use of other techniques which form a mechanical bond between the thermoelectrical module and the heat transfer blocks associated with the hot and cold sides thereof.

Another object of the invention is to provide a completely vapor-sealed module block assembly to prevent moisture vapor from permeating the insulation and migrating to the thermoelectric elements, thereby increasing the operating life and efficiency.

Another object of the invention is to provide an improved thermoelectric module block assembly wherein the heat transfer blocks conducting the heat to and from the heat dissipating and abstraction structure are coated within a thin, ceramic or vitreous layer to electrically insulate the heat transfer blocks from copper bus bars in the module, yet insure good heat transfer therebetween.

Still another object of the invention is to provide thermoelectric apparatus in accordance with the foregoing objects in which the hot and cold sides of the apparatus are more effectively isolated from a standpoint of heat transfer.

Additional objects and advantages will be apparent from reading the following detailed description taken in conjunction with the drawings wherein.

Figure 1:
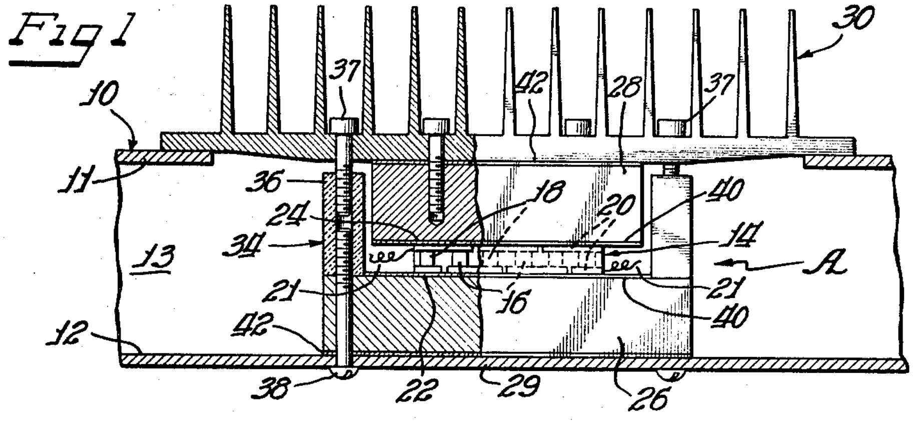
FIGURE 1 is a cross-sectional view of a thermoelectric module block assembly constructed in accordance with the principles of the present invention.

Referring now to the drawings, and particularly to FIGURE 1, the improved module block construction of the present invention, designated generally at A, is adapted to be incorporated in a wall panel 10 of a refrigerator or similar apparatus. The wall panel comprises two spaced walls 11 and 12 forming a space 13 which is preferably filled with insulation material such as polyurethane foam (not shown). At least a portion of the inside wall 12, as will be clear from the following description, will also serve as a heat abstraction plate which is in thermal relationship with the material within the refrigerated enclosure.

The heat of the module block assembly is a panel-like thermoelectric module 14 of any conventional type having a plurality of P-type and N-type semi-conductor elements 16, 18 connected in series by means of copper bus bars 20 to provide alternating P–N and N–P junctions on opposite sides of the module panel. As understood by those skilled in the art, the thermoelectric module is a heat pumping unit which is adapted to heat or cool, depending on the polarity of the uni-directional electrical energy supplied thereto by conductors 21. In other words, when energized, one side of the thermoelectric panel will become hot and the other side will become cold; and either side can be the hot (or cold) side depending on the direction of current flow. For purposes of this specification, however, it will be assumed that the unit is to be arranged in a refrigeration apparatus and the cold side, in thermal association with the refrigerated space, is designated at 22. The hot side, thermally associated with outside ambient (or sink) conditions, is designated at 24.

In order to conduct the heat toward and away from the cold and hot sides of the module as rapidly as possible, a pair of heat transfer blocks 26, 28, preferably made of aluminum or other high K-factor material, are provided. Heat transfer block 26, associated with the cold side of the module, is in thermal communication with a heat abstraction plate 29 which may comprise an integral section of the inner wall 12 of the panel. Heat transfer block 28, associated with the hot side of the module, is in thermal communication with heat dissipating fin structure 30 located on the outside of the panel and preferably in a stream of forced-circulated air.

Heretofore, it has been conventional to solder the thermoelectric module to the heat transfer blocks. However, the relatively thick solder layer required to form a secure bond results in appreciable heat transfer losses. In addition, these soldering techniques are expensive, requiring many manual operations and careful inspection, and the heating inherently involved in the soldering process can cause damage to the soldered joints between the semi-conductor elements and thus bus bars, and even to the semi-conductor elements themselves, if extreme precautions are not taken.

Accordingly, in order to avoid a mechanical interface between the heat transfer blocks and the thermoelectric module such as provided by soldering, the fin structure, the cold plate, the heat transfer blocks, and the thermoelectric module are held together in a rigid assembly by the clamping force of securing means designated generally at 34.

Since the securing means 34 bridges the hot and cold sides, means are required for thermally isolating the fin structure 30 from the cold plate 12. Preferably, this takes the form of a thermal barrier or coupling member 36. This coupling member, made of plastic or other insulating material, provides an insulating bridge between a first set of threaded fasteners 37 connecting the fin structure and heat transfer block 28 to the coupling member and a second series of threaded fasteners 38 holding the cold plate and heat transfer block 26 to the other side thereof. After the elements are assembled in the arrangement shown in FIGURE 1, the space 13 between the walls is filled with insulation (not shown).

As pointed out in the preliminary remarks, one of the most important aspects of the invention involves the use of an electrically insulating, thermally conductive coating on the surface of the heat transfer blocks 26, 28. The copper bus bars 20 on the thermoelectric module form a conductive matrix which in the conventional module is exposed. If a conductor, such as an aluminum heat transfer block, is placed in contact with the surface of the module, the bus bars would be shorted out. Therefore, it is apparent that there must be an electrically insulating interface between the module and the heat transfer blocks. Lacquers and enamels applied to the module surface have not proven satisfactory in that they are easily scratched; and it is sometimes difficult to assure that the insulating material on the surface will be effective. The use of separate insulating sheets, such as mica or beryllium oxide makes the assembly procedure more difficult.

In the present invention, a "glassy" ceramic coating 40 is applied, not to the thermoelectric module where its application would require heating, but to the face of the heat transfer block to be placed in contact therewith. One of the many advantages of this technique is the fact that the coating can be applied in a very thin layer (preferably .003–.005 inch), said layer being firmly bonded to the aluminum block. This thin layer provides satisfactory electrical insulating properties, yet insures excellent heat transfer across the interface.

The ceramic coating can be applied to commercial F–110 or 3003 aluminum, for example, by cleaning the surface to be coated, spraying it with a porcelain frit slurry, and then firing at an elevated temperature (below the melting point of the aluminum substrate). Suitable processing techniques and methods for applying the coating are described in Bulletin AL–2a of the Porcelain Enamel Institute, Washington, D.C.

The finished coating is in the form of an evenly glazed surface with a substantially uniform thickness from .003 to .005 inch. The term "ceramic coating," as used herein, is applied to "glassy" types of ceramic coatings, commonly referred to as vitreous enamels or porcelain enamels, including $K_2O$, $Na_2O$, $B_2O_3$, $PbO$, $Li_2O$ as fluxes.

When the module block assembly is put together, the thermoelectric module is firmly engaged between the two heat transfer blocks with sufficient force to provide good heat transfer between the blocks and the module. It is obvious that the heat rejecting fin structure and heat transfer block 28 can be formed integrally; however, when they are formed into two sections such as shown in FIGURE 1, it is desirable to provide a thin layer of thermal mastic 42, such as Presstite's No. 440.22. The mastic acts as a thermal conducting media and serves to fill up any voids or imperfections on the mating surfaces of the heat rejecting structure and heat transfer block to improve the heat transfer therebetween. Thermal mastic is also applied to the interfaces between the cold plate 12 and heat transfer block 26 and between the module faces and the porcelainized surfaces of the heat transfer blocks.

Figure 2:
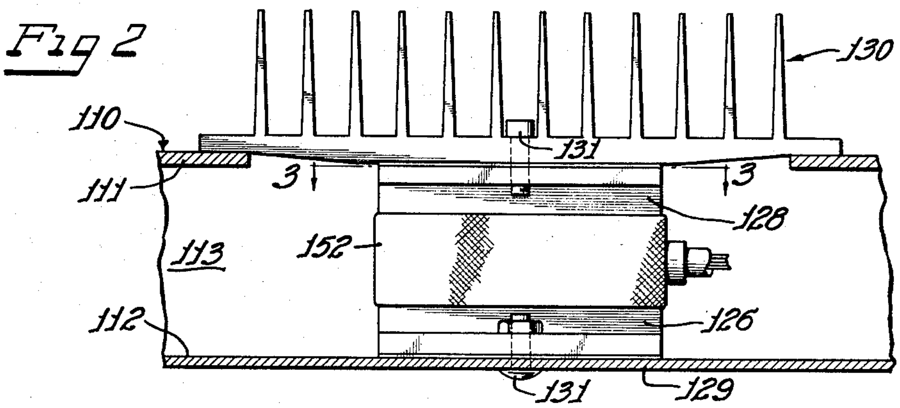
FIGURE 2 is a modification of the assembly shown in FIGURE 1.
Figure 3:
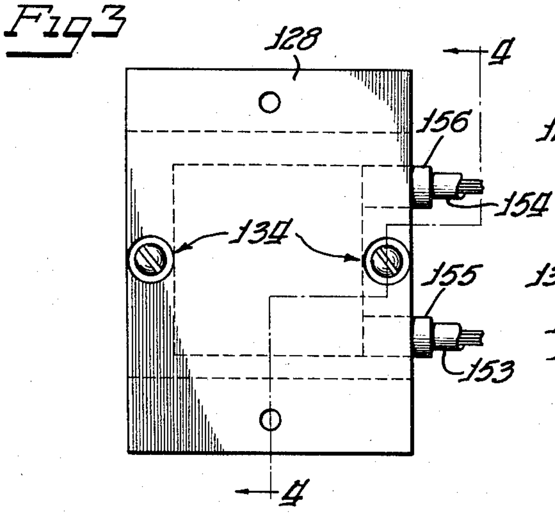
FIGURE 3 is a cross-sectional view taken along the plane of line 3—3 of FIGURE 2.
Figure 4:
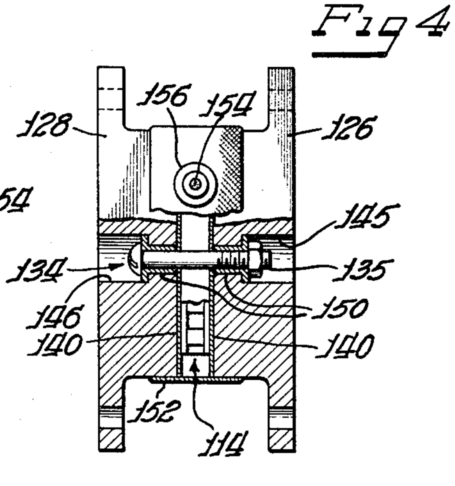
FIGURE 4 is a cross-sectional view taken along the plane of line 4—4 of FIGURE 3.

An alternative embodiment of the invention is shown in FIGURES 2–4, said embodiment including an additional feature in the form of a vapor sealing element to prevent moisture from migrating into the thermoelectric module elements. In referring to the module block assembly of FIGURES 2–4, corresponding elements common to both embodiments, will be designated by the same reference numerals used in FIGURE 1 but prefixed by the numeral 1.

As illustrated in FIGURE 2, the heat transfer blocks 126–128 are secured directly to the heat dissipating fin structure 130 and cold plate 129 by means of fasteners 131 attached to the flange portions extending from the marginal edges. The securing means 134 for holding the module and heat transfer blocks together in this embodiment takes the form of a set of bolts 135 extending through the heat transfer blocks and having their terminal portions received in recesses 145, 146 in the heat transfer blocks 126, 128 respectively. A thermal barrier between the hot and cold sides of the assembly is provided by insulating inserts 150 engaging the bolts on opposite ends thereof. These inserts perform the same function as the insulating coupling member 36 in FIGURE 1. Otherwise, the two embodiments are structurally and functionally comparable.

The improved vapor sealing feature referred to above preferably takes the form of a strip of polyethylene or Mylar tape 152 extending around the marginal portions of the module and firmly seating against the adjacent portions of the two heat transfer blocks. The electrical conductor elements 153, 154 supplying electrical energy to the module are insertable through connectors 155, 156 formed on one side of the module and suitable openings in the tape. It is preferred that a coating of a suitable wax-type sealant, such as Flex-O-Wax "C" (1774) or Mobil-Wax 2305, be applied over the sealing tape and confined within the area bounded by the mounting lug extensions. This sealant assures a vapor-tight module assembly and further seals around the electrical leads. In addition to sealing the individual module assemblies, the entire cooling block assembly which may comprise several individual module block assemblies, may be sealed with this type of sealant material.

Another important aspect of the embodiment shown in FIGURES 2–4 is that the assembly technique is greatly simplified. The individual module assemblies, that is the subcombination, including the aluminum heat transfer blocks and the thermoelectric module (as shown in FIGURES 3 and 4) are preassembled prior to installation in the wall panel of the refrigerator. The bolt holes for fasteners 131 in the flange-like extensions of heat transfer blocks 126, 128 automatically locate the module assemblies in their proper relation. Consequently, expensive and complicated tooling, fixtures, and jigs required for the attachment of a conventional module block assembly are eliminated; and considerable savings in assembly time can be realized.

While this invention has been described in connection with certain specific embodiments thereof, it is to be understood that this is by way of illustration and not by way of limitation; and the scope of this invention is defined solely by the appended claim which should be construed as broadly as the prior art will permit.

What is claimed is:

1. A vapor-sealed thermoelectric module block assembly comprising a thermoelectric module including a plurality of P-type and N-type thermoelectric elements, conductor element forming a plurality of alternating P-N and N-P junctions, said junctions providing a hot side and a cold side for said module, and means for supplying unidirectional electrical energy to said module; heat transfer blocks disposed on opposite sides of said module, each said heat transfer block being formed of a material having very high thermal conductivity; a ceramic coating bonded to at least one side of each said heat transfer block, each said heat transfer block having a surface for engagement with said module substantially congruent with the opposite surfaces of said module; securing means for holding said heat transfer blocks to said module such that the ceramic coating is in engagement with said module and provides a thermally-conductive electrically-insulating interface therebetween, said securing means thermally isolating the opposite sides of said module from each other; and a strip of insulating and moisture vapor resistant tape completely surrounding the marginal portions of said module and in contact with each of said heat transfer blocks to prevent moisture vapor from permeating the space between the hot and cold sides of said module.

References Cited

UNITED STATES PATENTS

| | | | |
|---|---|---|---|
| 3,035,109 | 5/1962 | Sheckler | 136—212 X |
| 3,075,360 | 1/1963 | Elfving et al. | 136—204 X |
| 3,168,816 | 2/1965 | Petrie | 62—3 |
| 3,194,023 | 7/1965 | Sudmeier | 62—3 |
| 3,301,714 | 1/1967 | Lyman | 136—212 |

ALLEN B. CURTIS, *Primary Examiner.*